United States Patent
Cipra

(10) Patent No.: US 7,604,259 B2
(45) Date of Patent: Oct. 20, 2009

(54) DAMPER ROOT RING

(75) Inventor: Dale O. Cipra, Chatsworth, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 70 days.

(21) Appl. No.: 11/838,912

(22) Filed: Aug. 15, 2007

(65) Prior Publication Data

US 2009/0045620 A1 Feb. 19, 2009

(51) Int. Cl.
*F16L 51/02* (2006.01)
(52) U.S. Cl. .......................... 285/226; 285/9.1; 29/454
(58) Field of Classification Search .............. 285/226, 285/228, 9.1; 29/454
See application file for complete search history.

(56) References Cited

U.S. PATENT DOCUMENTS

| 1,345,971 | A | * | 7/1920 | Star | 285/226 |
|---|---|---|---|---|---|
| 1,661,131 | A | * | 2/1928 | Duffield | 92/42 |
| 1,966,202 | A | * | 7/1934 | Pfefferle | 277/605 |
| 2,056,106 | A | * | 9/1936 | Kuhn | 267/35 |
| 2,886,885 | A | * | 5/1959 | Reid, Jr. | 29/421.1 |
| 2,912,263 | A | * | 11/1959 | Parley | 285/371 |
| 2,920,656 | A | * | 1/1960 | Bertolet, Jr. | 92/42 |
| 2,930,116 | A | * | 3/1960 | Minges | 228/189 |
| 3,232,640 | A | * | 2/1966 | Donkle, Jr. | 285/93 |
| 5,601,316 | A | * | 2/1997 | Totino et al. | 285/226 |
| 6,422,611 | B1 | * | 7/2002 | Jin et al. | 285/300 |
| 6,631,928 | B1 | * | 10/2003 | Sakata | 285/226 |
| 6,948,744 | B2 | * | 9/2005 | Atansoski et al. | 285/226 |

* cited by examiner

*Primary Examiner*—David E Bochna
(74) *Attorney, Agent, or Firm*—Carlson, Gaskey & Olds PC

(57) ABSTRACT

A damper that provides damping to the motion caused by flow induced vibration of a bellows type expansion joint. The damper is at least partially filled with a damping medium and located at a root region of the bellows type expansion joint convolutions. The damper is manufactured in segments which have an attachment structure therebetween to facilitate retrofitting of the damper to various conduits that are experiencing or are expected to experience flow induced vibration.

17 Claims, 2 Drawing Sheets

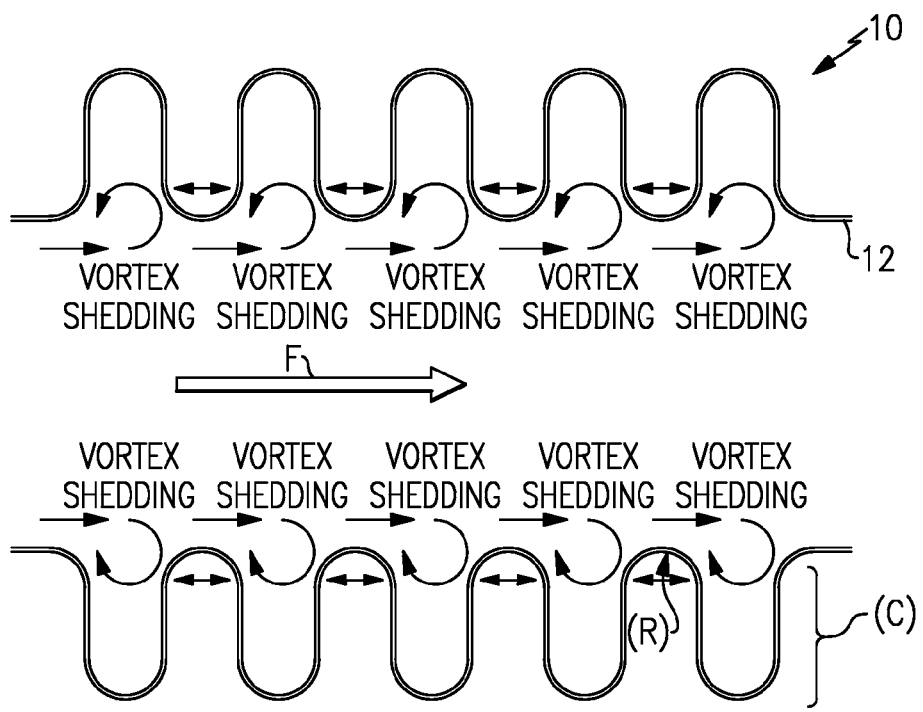
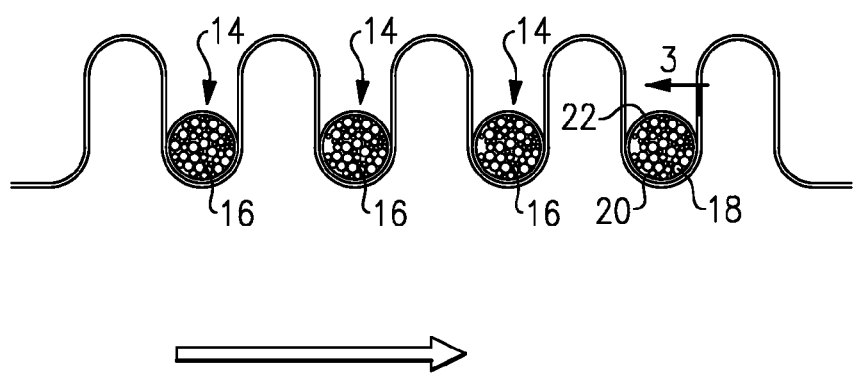
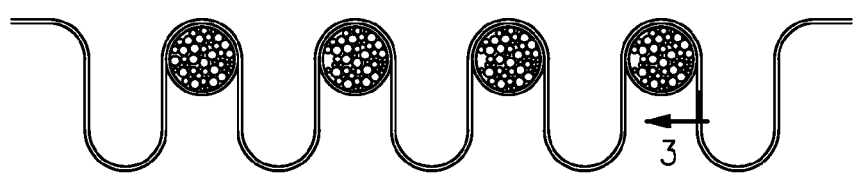
FIG.2

DAMPER ROOT RING

BACKGROUND OF THE INVENTION

The present invention relates to a damper, and more particularly to a damper root ring for a bellows type expansion joint.

Bellows type expansion joints are often utilized in piping and ducting systems adjacent to an unstable flow regime. Fluids which flow along internal convolutions of the bellows expansion joint may produce flow disturbances. One type of flow disturbance is flow induced vortex shedding. Flow induced vortex shedding is an unsteady flow that may occur at certain fluid flow velocities. The flow disturbances and structural response may result in feedback which may cause large displacements adjacent the bellows convolutions and high cycle fatigue. Over a period of time the fatigue may ultimately produce failure in the bellows type expansion joint.

Accordingly, it is desirable to provide a damper to minimize undesirable structural response in a bellows type expansion joint.

SUMMARY OF THE INVENTION

The damper according to the present invention provides damping to the motion of a bellows type expansion joint. The damper is located at the root region of the convolutions and is at least partially filled with a damping medium to provide damping therefor. The damping medium may include particles with or without an entrapped fluid to provide particle damping. The damper may be manufactured in segments which have an attachment structure therebetween to facilitate retrofitting of the damper to various conduits that are experiencing or are expected to experience flow induced vibration.

The present invention therefore provides a damper to minimize undesirable structural response in a bellows type expansion joint.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1 is a general sectional view of an exemplary bellows type expansion joint;

FIG. 2 is a sectional view of a bellows type expansion joint having a multiple of damper root rings according to the present invention attached thereto;

DETAILED DESCRIPTION OF THE DISCLOSED EMBODIMENT

FIG. 1 schematically illustrates a bellows-type expansion joint 10 located within a conduit 12 typical of a pipe or duct system which communicates a fluid flow (illustrated schematically by arrow F).

Flow induced vortex shedding is an unsteady flow that may occur at certain fluid flow velocities. Flow induced vortex shedding may cause an alternating force adjacent a root region R of one or more convolutions C. Eventually, if the frequency of vortex shedding matches the resonant frequency of the structure, the structure may begin to resonate and the structure's movement can become self-sustaining which may ultimately result in failure.

Figure 3:
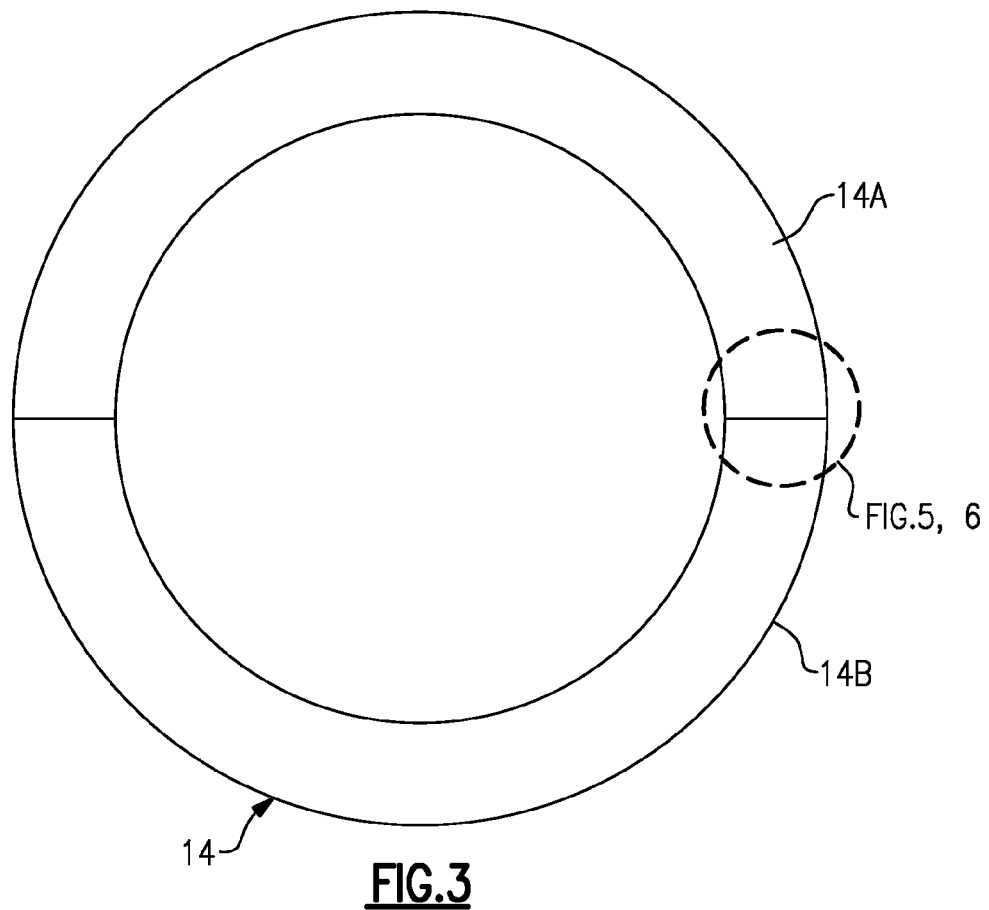
FIG. 3 is a front plan view of a damper root ring.

Referring to FIG. 2, resonance within the conduit 12 is minimized or eliminated by attachment of a damper 14 at the root region R of one or more convolutions C. The damper 14 is a hollow generally annular member (FIG. 3) which is fit to the root region R to damp motion often cased by flow induced vibration. It should be understood that although the damper 14 disclosed in the illustrated embodiment is circular in cross-section, other non-uniform cross sectional shapes (FIG. 4) may alternatively be provided.

The damper 14 is at least partially filled with a damping medium 16. The damping medium may include particles 18 with or without an entrapped fluid 20 to provide particle damping. It should be understood that various damping mediums may be utilized to provide particle damping. Particle damping is defined herein as the general terminology utilized for a family of loss mechanisms that occur when particles are placed in a container that is in or on a vibrating structure. Friction and impact interactions between the particles 18 themselves and with the wall 22 of the damper 14 provide an appreciable increase in structural damping by absorption of a portion of the energy from the fluid flow F there through. Bellows expansion joints 10 may be operated adjacent an unstable flow regime such that the damper 14 provides added structural margin against high cycle fatigue.

Figures 4, 5:
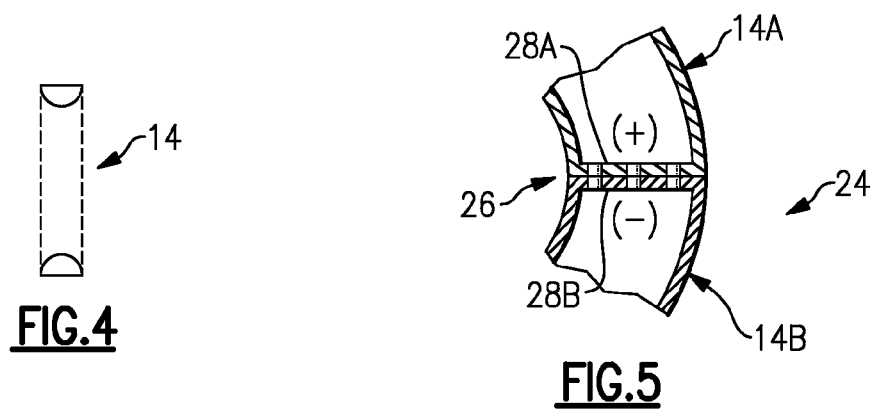
FIG. 4 is a sectional view of another bellows type expansion joint having a multiple of damper root rings according to the present invention attached thereto.
FIG. 5 is an expanded view of a damper root ring attachment interface.
Figure 6:
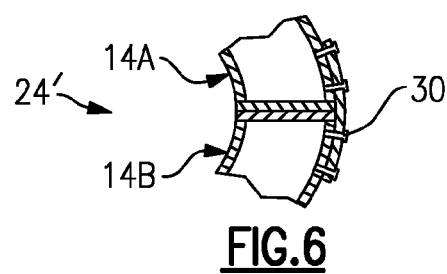
FIG. 6 is an expanded view of another damper root ring attachment interface.

Referring to FIG. 5, the damper 14 may be manufactured in segments 14A, 14B which have an attachment structure 24 therebetween. The multi-segment split-ring arrangement structure facilitates retrofitting of the damper 14 to various conduits 12 after manufacture and/or installation that is experiencing or is expected to experience flow induced vibration. The attachment structure 24 may include a magnetic interface 26 at adjacent end sections 28A, 28B such that the segments 14A, 14B are readily assembled to the conduit 12. Alternatively, or in addition thereto, another embodiment of the attachment structure 24' may include fasteners 30 (FIG. 6). It should be understood that various permanent and non-permanent attachment structures may alternatively or additionally be utilized.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A damper for a bellows-type expansion joint comprising:
   a hollow annular member mountable within a root region of a convolute of a bellows-type expansion joint, said hollow annular member formed from a multiple of segments; and
   a damping medium within said hollow annular member, said damping medium includes a multiple of heavier-than-air particles free to move within said hollow member such that friction and impact interactions between said multiple of heavier-than-air particles provide structural damping of the bellows-type expansion joint.

2. The damper as recited in claim 1, wherein said hollow annular member is circular in cross-section.

3. The damper as recited in claim 1, further comprising an attachment structure to connect each of said multiple of segments.

4. The damper as recited in claim 3, wherein said attachment structure includes a magnetic attachment.

5. The damper as recited in claim 3, wherein said attachment structure includes a fastener.

6. The damper as recited in claim 1, wherein said damping medium includes a liquid fluid.

7. The damper as recited in claim 1, wherein said hollow annular member is non-uniform in cross-section.

8. The damper as recited in claim 1, wherein said hollow annular member is D-shaped in cross-section.

9. An expansion joint comprising:
   a bellows-type expansion joint having at least one convolute which defines a root region;
   a hollow annular member mountable within said root region; and
   a damping medium within said hollow member said damping medium includes a multiple of heavier-than-air particles free to move within said hollow member such that friction and impact interactions between said multiple of heavier-than-air particles provide structural damping of the bellows-type expansion joint.

10. The joint as recited in claim 9, wherein said hollow annular member is circular in cross-section.

11. The damper as recited in claim 9, wherein said hollow annular member is formed from a multiple of segments.

12. The damper as recited in claim 11, further comprising an attachment structure to connect each of said multiple of segments.

13. The damper as recited in claim 12, wherein said attachment structure includes a magnetic attachment.

14. The damper as recited in claim 13, wherein said attachment structure includes a fastener.

15. The damper as recited in claim 9, wherein said damping medium includes a fluid.

16. A method of damping through a bellows-type expansion joint comprising:
   (A) mounting a hollow annular member within at least one convolute which defines a root region of the expansion joint, the hollow annular member containing a damping medium that includes a multiple of heavier-than-air particles free to move within the hollow annular member such that friction and impact interactions between the multiple of heavier-than-air particles provide structural damping of the bellows-type expansion joint.

17. A method as recited in claim 16, wherein said step (A) further comprises:
   magnetically attaching a first segment of the hollow annular member to a second segment of the hollow annular member.

* * * * *